2,776,223
METHOD OF PRODUCING A PILE FABRIC OF CELLULOSE ACETATE

Russell Jacques Brown and John Downing, Spondon, near Derby, England, assignors to British Celanese Limited, a British company No Drawing. Application August 24, 1953, Serial No. 376,269

Claims priority, application Great Britain October 7, 1952

3 Claims. (Cl. 117—17)

This invention relates to textile and other materials and especially to pile-surfaced materials containing cellulose acetate in the pile and/or in the backing.

It is known to make pile fabrics by bonding short textile fibres to a suitable backing, for example a textile fabric, the fibres being projected on to the adhesive-coated fabric, for example by blowing or by the action of an electrical field, and the adhesive being subsequently converted from the tacky condition to a non-tacky flexible condition. An important object of the present invention is to make pile fabrics of this kind containing cellulose acetate in the pile and/or in the backing, the said fabrics to have a soft handle, to be water-resistant and capable of resisting moderately elevated temperatures, for example up to 100° C., and being capable of dry-cleaning without damage.

In making pile fabrics of the kind referred to containing cellulose acetate, great difficulty was experienced in devising a suitable adhesive composition. One quality most necessary in the adhesive is that it should be obtainable in a very tacky condition. Unfortunately the adhesives in which this characteristic is most marked are for the most part highly water-sensitive even in the hardened condition. Adhesives showing considerable tackiness can be formulated from rubber either in solution or in the form of latex, but rubber has no specific adhesive properties towards cellulose acetate, and moreover is not resistant to dry-cleaning solvents even when vulcanized. Polychloroprene has the same disadvantages with less tackiness before hardening. Polyvinyl acetate can be used in solution or in dispersion, e. g. in a plasticizer or even in water, to formulate adhesives which are sufficiently tacky and which can be hardened to give a flexible coating. It has not, however, been found possible with polyvinyl acetate to obtain the desired soft handle in the product. Polyvinyl acetate is, moreover, defective in respect of resistance to elevated temperatures and to dry-cleaning solvents. The same lack of soft handle coupled with undue softening below 100° C. is obtained with polyvinyl chloride which, moreover, cannot readily be obtained in so tacky a condition as polyvinyl acetate and which needs special plasticizers, e. g. cyclohexyl phthalate, to give strong adhesion to cellulose acetate. The desired degree of tackiness is still more difficult to obtain with polymerized esters of acrylic acid and methacrylic acid. These polymers also are defective in resistance to dry-cleaning solvents. As is well known, the resistance to solvents of copolymers is usually relatively low, and various copolymers tried, including copolymers of vinyl acetate with vinyl chloride, proved unsuitable.

The present invention provides an eminently satisfactory method of obtaining the desired results. According to this method the adhesive comprises a linear condensation polymer which, by virtue of suitably spaced —NH— groups in its main chain, can be cross-linked to give a rubbery polymer together with an agent for effecting said cross-linkage, and after the application of the fibre to the adhesive layer the said cross-linkage is carried out by heating the material. The adhesive may be applied to the web in solution in a volatile liquid which is a non-solvent for the material both of the pile and of the web, and which is evaporated to leave a tacky coating on to which the fibre is projected. A slight swelling effect of the liquid on the materials is of advantage. The cross-linking agent comprises a bi- or poly-functional substance that reacts with —NH— groups so as to form links between individual polymer chains. The cross-linking agent should function only when, after application of the fibre, the material is heated. The bi- or poly-functional substance may, for instance, be one that reacts rapidly (e. g. so as to effect the desired cross-linkage in 5 to 20 minutes or even less) in the presence of an acid or other catalyst but not otherwise, and may be applied in conjunction with a potential acid or other activator that produces the the required catalyst when heated to the temperature at which the heat treatment is carried out.

The method of the invention is simple to operate and enables products of excellent quality to be made. The coating after cross-linking is of good tenacity and tear strength. It is flexible and has some degree of rubber-like elasticity without having an undesirable rubbery handle. The pile-surfaced material made by the process of the invention can be subjected to the usual dry-cleaning treatments without damage. Although of special value when cellulose acetate is a major constituent of the web and/or of the fibre, the method can also be used when both web and fibre are of other materials, as will be described later.

To obtain the desired properties in the cross-linked polymer, it is necessary that the chain-length of the linear polymer be very great; that the structure be not so regular to favour crystallinity or insolubility; and that the —NH— groups be not unduly numerous. Such polymers can be obtained (as described, for example, in British Patent No. 553,733) by reacting upon a linear polyester or polyester-amide (both referred to below as "the primary polymer") with a di-isocyanate so as to join primary polymer chains end to end by links containing a —CO.NH.R'''.NH.CO— groups (where R''' is a bivalent radical) derived from the di-isocyanate. Products obtained from the primary polymer in this way are termed "di-isocyanate-modified polymers."

The primary polymer may be a polyester which is a derivative of two components only, viz., a dibasic acid and a dihydroxy compound. In this case the chain flexibility that is necessary is most readily obtainable with an aliphatic dicarboxylic acid, e. g. succinic, adipic or sebacic acid, rather than with a cyclic dicarboxylic acid such as terephthalic acid, and with a branched chain glycol, e. g. 1,2-propylene glycol rather than a straight-chain glycol, such as ethylene glycol or 1,3-propylene glycol or a cyclic dihydroxy compound such as hydroquinone. This flexibility is more easily obtained in polyesters which are derived from more than two components, e. g. from a dicarboxylic acid and two different glycols or from a dicarboxylic acid, a glycol and a hydroxy carboxylic acid. We have obtained the best results however, when the primary polymer is a polyester-amide derived, for instance, from a dibasic acid, preferably an aliphatic acid such as those specified above, a dihydroxy compound, preferably a glycol such as ethylene glycol or a propylene glycol, and a third bifunctional component containing amino groups. This third component may be a diamine, e. g. hexamethylene diamine or other $\omega,\omega'$-polymethylene diamine, an amino alcohol, e. g. monoethanolamine or other primary amino alcohol, or an amino-carboxylic acid, e. g. 6-amino caproic acid or other ω-amino paraffinic carboxylic acid. For reasons referred to above it will be understood that cyclic diamines, amino phenols and amino aromatic acids are less useful as the third component. The ester amide may be derived from other combinations of two or more components, e. g. amino-alcohols and dibasic acids; amino-acids, amino-alcohols and dibasic acids; and amino-alcohols, diamines and dibasic acids. The primary polymer should have an average molecular weight of at least 3,000 and preferably 4,000 or more. Particularly useful as the primary polymer are long-chain condensation polymers the chains of which contain segments of molecular weight at least 4,000, and of the formula

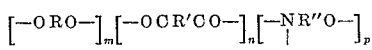

where R, R' and R'' are bivalent paraffinic residues, and $m$, $n$, and $p$ are whole numbers, $m$ being 4 to 10 times $p$, and $p + m$ being at least equal to $n$. R and R'' may with advantage be ethylene radicals, and R' a tetramethylene radical, and $m$ may be 4 to 6 times $p$, and $n$ substantially equal to $m + p$. The primary polymer may, for example, be a condensation polymer of ethylene glycol, adipic acid and monoethanolamine in molar proportions of about 5:6:1.

The di-isocyanate with which the primary polymer is modified should preferably be an aliphatic compound, e. g. ethylene di-isocyanate, 1,3-propylene di-isocyanate, 1,4-butylene di-isocyanate or other ω,ω'-polyalkylene di-isocyanate. 1,6-hexamethylene di-isocyanate is particularly suitable. Cyclic di-isocyanates, e. g. p-phenylene di-isocyanate, p-cyclohexyl di-isocyanate, 14-di-isocyanomethyl benzene, and 4,4'-di-isocyanomethyl diphenyl methane and 1,5-di-isocyano-naphthalene, are less suitable. The di-isocyanate-modified polymer should be of average molecular weight at least 20,000 and preferably at least 50,000.

Various cross-linking agents for polymers containing —NH— groups are available. The cross-linking of di-isocyanate-modified polymers is described in British Patents Nos. 580,524 and 580,526. The cross-linking agent may comprise formaldehyde or a substance that is capable of liberating formaldehyde under appropriate conditions, or a substance containing one or more reactive methylol or substituted methylol groups. Particularly suitable for the purpose of the present invention are acetone-soluble resin-forming substances containing a plurality of methylol groups and/or methoxymethylol groups, e. g. the monomethyl and dimethyl ethers of dimethylol urea and especially the hexamethyl ether of hexamethylol melamine. Polyisocyanates and polyisothiocyanates may also be employed.

By employing resin-forming substances of the kind referred to in conjunction with suitable potential acids (i. e. substances that develop acidity when heated), cross-linking agents can be obtained which are substantially inoperative at temperatures up to about 100° C. (so enabling evaporation of solvent to be effected without cross-linkage), but which undergo rapid reaction as a result of the catalytic effect of the acid liberated when the material is heated to a substantially higher temperature. The action of the melamine ether referred to, for example, is very slow under neutral conditions even at temperatures up to about 130° C. but is rapid at higher temperatures, e. g. 140° C., in the presence of acid. The use of such potentially acid accelerators is described in British Patent No. 580,526. Particularly suitable for the purpose of the present invention are acetone-soluble halogenated phenols, especially halogenated naphthols such as 2,4-dichloronaphthol.

The cross-linked polymer should be rubbery in the sense of having some degree of rubber-like elasticity, i. e. it should have a recoverable extension of at least 25% and preferably higher, e. g. between 50 and 300%.

The boiling range of the volatile solvent should preferably be within the limits 50 to 140° C. so as to avoid, on the one hand, undue evaporation during application of the adhesive, and on the other hand the necessity of employing a temperature too near that at which the curing rate of the polymer becomes substantial in removing the solvent prior to forming the pile. Solvents based on aliphatic ketones boiling within the range specified, and especially mixtures of methyl ethyl ketone with methyl isopropyl ketone, methyl isobutyl ketone or di-ethyl ketone, have been found particularly suitable when the backing web consists of or contains cellulose acetate. Swelling agents for cellulose acetate of appropriate boiling point such as the monoethyl ether of ethylene glycol may also be present with advantage. Only slightly inferior to the ternary mixture specified is the monoethyl ether of ethylene glycol alone, and this has the advantage that solvent recovery is simplified. Other aliphatic ethers, as well as alcohols, having suitable boilings points, may be employed in formulating the volatile solvent.

In formulating the compositions to be employed in bonding, it is preferable to use as little solvent as is consistent with obtaining a composition that can easily be spread on to the web to be coated. Thus the concentration of the polymer should preferably be between 30 and 50%, e. g. 40 to 50%, by weight of the total composition. The amount of cross-linking agent required in connection with a particular polymer depends on the constitution of the agent. With the hexamethyl ether of hexamethylol melamine, for example, useful results have been obtained with proportions ranging from about 3 to about 12%, and especially between 4 and 8%, based on the weight of the polymer. The composition may contain dyes, pigments and other effect materials. Plasticizers are not generally necessary, but if for any reason a product of particularly soft handle is required, plasticizers may be incorporated. Suitable plasticizers for cellulose acetate include phthalates such as dimethyl, diethyl, dibutyl, di-(methoxyethyl) and the di-(methylcyclohexyl) phthalates, methyl phthalyl ethyl glycolate, ethyl phthalyl ethyl glycolate, butyl phthalyl, butyl glycolate and liquid phosphoric acid aromatic esters such as tricresyl phosphate.

The pile-surfaced materials of the invention are preferably made by a continuous process in which the web which is to form the backing, in the course of its travel past a number of successive stations: receives a coating of the adhesive; a subjected to evaporative conditions at a temperature below that at which substantial cross-linking occurs, to evaporate the volatile solvent; has projected on to this coating the fibre required to form the pile; is carried through a heated region in which cross-linkage of the polymer occurs, converting the adhesive into a flexible, permanent layer which anchors the pile to the web; and is collected without damaging the pile. The projection of the fibre on to the web may be done by means of an air blast or under the impulsion of a constant or varying electric field of high potential in which the fibres become charged. The cross-linkage may be effected by carrying the material under tension on a pin-stentor chain at constant width through a heated chamber.

With cellulose acetate fibre, excellent results have been obtained using as the backing-fabric a web of cotton or other form of cellulose, including regenerated cellulose. Fabrics of high-tenacity regenerated cellulose such as is obtainable by saponifying cellulose acetate yarn that has been stretched considerably in steam or hot water are particularly suitable when a strong light-weight backing fabric is required. Backing fabrics of other materials can be used, including materials of higher dielectric constant and dielectric strength and lower moisture regain than cotton, for example, silk, wool, casein, soya-bean protein and other proteinaceous fibres; cellulose acetate; fibre-forming condensation polymers such as nylon; fibre-forming addition polymers such as copolymers of vinyl chloride with vinyl acetate, with vinylidene chloride, or with acrylonitrile, or of acrylonitrile with methacrylonitrile; and mineral fibre-forming materials such as glass. Instead of using a fabric for the backing material, other flexible non-metallic webs can be used, e. g. webs of paper or films of regenerated cellulose or of a cellulose ester or ether (e. g. the acetate, propionate, acetate-propionate or acetate-butyrate, or ethyl cellulose) or of any of the synthetic polymers referred to above. Metal fabrics or foils can also be used.

With a backing web made of or containing cellulose acetate the staple fibre used may be composed of any of the materials specified above with reference to the backing fabric. Excellent products have been obtained with staple fibre of length between 0.5 and 5 mm. and especially between 0.5 and 2 mm. and of denier 2.5 to 5. The fibre should be free from oil and substantially dry.

The invention includes the use of cellulose acetate fibres in admixture with other fibres, and the use, as the backing, of mixed fabrics, e. g., fabrics containing yarns of cellulose acetate in admixture with yarns of any other of the fibre-forming materials referred to above. The backing fabric may be composed of continuous-filament yarns; or of staple-fibre yarns; or of a mixture of the two. When the backing fabric is composed wholly or for the most part of a fibre-forming material to which the adhesive does not stick as readily as it does to cellulose acetate, it is of advantage to employ that material in the form of a staple fibre yarn or at least to have picks or warps of such yarn at intervals in the fabric. Similarly with such a material it is of advantage to interweave cellulose acetate yarns at intervals.

The best results have been obtained with a cellulose acetate fibre and a backing of a cellulose acetate woven fabric, e. g. a jappe, taffeta, poplin or satin fabric. A novel purpose to which pile fabrics made from such a combination can be put is in making eider-downs and like coverlets having a reduced tendency to slip.

Products particularly useful for trimmings, e. g. in millinery, and products useful as furnishing fabrics, can be made by bonding cellulose acetate fibre to a film or foil of cellulose acetate. Owing to the poor specific adhesive properties of cellulose acetate towards most adhesives, the manufacture of such materials has hitherto presented serious difficulty. It will, of course, be understood that materials having a backing of film or foil will not possess the soft handle referred to above as one of the advantages obtainable by the present invention when using fabric backings.

The following examples, in which all the parts are by weight, illustrate the production of pile-surfaced fabric according to the invention:

*Example 1*

The adhesive had the following composition:

250 parts of "Vulcaprene AC230" (registered trademark);
104 parts of methyl ethyl ketone;
104 parts of methyl iso-butyl ketone;
120 parts of the mono-ethyl ether of ethylene glycol;
12.5 parts of "Vulcafor VHM" (registered trademark);
2.0 parts of "Vulcafor VDC" (registered trademark).

"Vulcaprene AC230" is a polyester-amide made by poly-condensation of adipic acid, ethylene glycol and monoethanolamine and modified by a treatment with hexamethylene di-isocyanate which links the polymer chains end to end to give a linear polymer of very high molecular weight containing

—CO.NH.CH2CH2CH2CH2CH2CH2NH.CO— groups. "Vulcafor VHM" is a complex amine-formaldehyde resin-forming condensation product which under neutral conditions does not act upon the "Vulcaprene" at temperatures below 140° C. but reacts rapidly in the presence of acid at such temperatures to give the desired cross-linking. "Vulcafor VDC" is a halogenated naphthol which, at a temperature of 140° C. liberates acid that catalyses the reaction between the "Vulcafor VHM" and the "Vulcaprene." The adhesive was made by milling the solvent and the resin-forming product into the polymer until a smooth solution resulted to which the potential acid (i. e., the halogenated naphthol) was added. After this addition the solution was found to remain stable for several days.

A plain woven fabric of continuous-filament cellulose acetate yarn of weight 2 to 3 oz./sq. yd. was drawn horizontally past a coating station, where a coating of the adhesive was applied and spread by a resiliently mounted doctor blade to leave a layer 0.005 inch thick. The coated fabric was carried through a cabinet in which the volatile solvents were substantially evaporated, at a temperature of 130° C. in the course of about three minutes. The fabric then passed through a region in which the pile was formed by electrostatic projection of oriented fibres on to the adhesive surface. From the condenser the fabric was run through a stove kept at a temperature of 140° C. Here the cross-linking occurred in the course of about 15 minutes. The fabric was then collected.

In the region of pile formation the adhesive-coated fabric passed first horizontally through an electrostatic condenser with horizontal electrodes, the upper one being a grid and the lower one a plate, and then downwards through a second, parallel-plate condenser, inclined at about 60° to the horizontal. One electrode of each condenser was connected through a variable spark gap to a secondary terminal of a high tension magneto, the other secondary terminal, and the other electrodes of the condensers, being earthed. By driving the magneto at a suitable speed an alternating E. M. F. of frequency about 11 cycles per second was developed. The fibre from which the pile was to be formed was dropped through the grid of the first condenser into the path of the fabric. The spark gaps were adjusted so that the fields produced in the condensers caused rapid oscillation of the fibres (orientated perpendicular to the surface of the fabric) between the adhesive-coated surface and the neighbouring electrode. In the first condenser some fibres became anchored in the adhesive, the remainder being carried into the second field where most of them became anchored and the rest fell away out of the path of the fabric. The apparatus used was that described and illustrated in Ewing et al., United States Patent No. 2,681,446, but other forms of electro-coating apparatus could be used. The field, for instance, could be provided by one or a series of condensers charged from a transformer fed by an A. C. generator driven by a variable speed D. C. motor.

The fibre used was oil-free, dry, staple fibre of cellulose acetate of length 0.5 to 1 mm. and denier 2.5 to 5.

*Example 2*

The process was carried out as described in Example 1 except that the adhesive had the composition:

20 parts of a hexamethylene di-isocyanate-modified condensation polymer of ethylene glycol, adipic acid, and monoethanolamine, obtained as described in Example 1 of specification No. 580,524 (Imperial Chemical Industries Ltd.), page 10, lines 78–112;
75 parts of diethyl ketone;
75 parts of methyl ethyl ketone;
1.5 parts of the hexamethyl ether of hexamethylol melamine;
0.15 part of 2,4-dichloro-naphthol.

Instead of the solvent mixture specified, equal parts of methyl ethyl ketone and toluene, or of ethylene dichloride and benzene, or of ethyl lactate and benzene, can be employed.

*Example 3*

The process was carried out as in Example 2, but using

Having described our invention, what we desire to secure by Letters Patent is:

1. Process for the production of a pile fabric by bonding staple fibres of cellulose acetate to a base fabric, comprising, in turn, coating the base fabric with a solution in volatile solvent of an adhesive consisting of a 1,6 hexamethylene diisocyanate-modified condensation polymer of ethylene glycol, adipic acid, and monoethanolamine in molar ratio of 5:6:1, 2,4-dichloronaphthol and the hexamethyl ether of hexamethylol melamine, evaporating off the solvent to form an adhesive layer, applying the staple fibres of cellulose acetate by electro-static means to the adhesive layer, passing the fabric through a heated region to effect cross-linking of the adhesive, and collecting the fabric without damaging the pile.

2. Process for the production of a pile fabric by bonding staple fibres of cellulose acetate to a base fabric composed substantially of cellulose acetate comprising, in turn, coating the base fabric with a solution in volatile solvent of an adhesive consisting of a 1,6 hexamethylene diisocyanate-modified condensation polymer of ethylene glycol, adipic acid, and monoethanolamine in molar ratio of 5:6:1, 2-4-dichloronaphthol and hexamethyl ether of hexamethylol melamine, evaporating off the solvent to form an adhesive layer, applying the staple fibres of cellulose acetate by electro-static means to the adhesive layer, passing the fabric through a heated region to effect cross-linking of the adhesive, and collecting the fabric without damaging the pile.

3. Process for the production of a pile fabric by bonding staple fibres of cellulose acetate to a base fabric composed substantially of cellulose comprising, in turn, coating the base fabric with a solution in volatile solvent of an adhesive consisting of a 1,6 hexamethylene diisocyanate-modified condensation polymer of ethylene glycol, adipic acid, and monoethanolamine in molar ratio of 5:6:1, 2,4-dichloronaphthol and hexamethyl ether of hexamethylol melamine, evaporating off the solvent to form an adhesive layer, applying the staple fibres of cellulose acetate by electro-static means to the adhesive layer, passing the fabric through a heated region to effect cross-linking of the adhesive, and collecting the fabric without damaging the pile.

References Cited in the file of this patent

UNITED STATES PATENTS

| | | |
|---|---|---|
| 2,567,327 | Ewing | Sept. 11, 1951 |

FOREIGN PATENTS

| | | |
|---|---|---|
| 553,733 | Great Britain | of 1943 |
| 580,524 | Great Britain | of 1946 |
| 580,525 | Great Britain | of 1946 |
| 581,134 | Great Britain | of 1946 |